US012126985B2

(12) United States Patent
Terentiv et al.

(10) Patent No.: US 12,126,985 B2

(45) **Date of Patent: *Oct. 22, 2024**

(54) METHODS, APPARATUS AND SYSTEMS FOR 6DOF AUDIO RENDERING AND DATA REPRESENTATIONS AND BITSTREAM STRUCTURES FOR 6DOF AUDIO RENDERING

(71) Applicant: DOLBY INTERNATIONAL AB, Amsterdam (NL)

(72) Inventors: Leon Terentiv, Erlangen (DE); Christof Fersch, Neumarkt (DE); Daniel Fischer, Fuerth (DE)

(73) Assignee: DOLBY INTERNATIONAL AB, Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,005

(22) Filed: Aug. 25, 2022

(65) Prior Publication Data

US 2023/0065644 A1 Mar. 2, 2023

Related U.S. Application Data

(63) Continuation of application No. 17/046,735, filed as application No. PCT/EP2019/058955 on Apr. 9, 2019, now Pat. No. 11,432,099.

(Continued)

(51) Int. Cl.

*H04S 7/00* (2006.01)
*G10L 19/008* (2013.01)

(Continued)

(52) U.S. Cl.

CPC ............ *H04S 7/303* (2013.01); *G10L 19/008* (2013.01); *G10L 19/167* (2013.01); *H04S 3/008* (2013.01);

(Continued)

(58) Field of Classification Search

CPC ..... G10L 19/008; G10L 19/167; G10L 19/20; H04S 2420/03; H04S 2400/01; H04S 2400/11

(Continued)

(56) References Cited

U.S. PATENT DOCUMENTS 9,477,307 B2 10/2016 Chizeck
9,847,088 B2 12/2017 Peters (Continued)

FOREIGN PATENT DOCUMENTS

CN 102714038 A 10/2012
CN 104981869 A 10/2015

(Continued)

OTHER PUBLICATIONS

"Draft MPEG-1 Architecture and Requirements" MPEG Meeting Apr. 2018, p. 5-6.

(Continued)

*Primary Examiner* — Alexander Krzystan

(57) ABSTRACT

The present disclosure relates to methods, apparatus and systems for encoding an audio signal into a bitstream, in particular at an encoder, comprising: encoding or including audio signal data associated with 3DoF audio rendering into one or more first bitstream parts of the bitstream, and encoding or including metadata associated with 6DoF audio rendering into one or more second bitstream parts of the bitstream. The present disclosure further relates to methods, apparatus and systems for decoding an audio signal and audio rendering based on the bitstream.

12 Claims, 11 Drawing Sheets

Related U.S. Application Data

Figure 1:
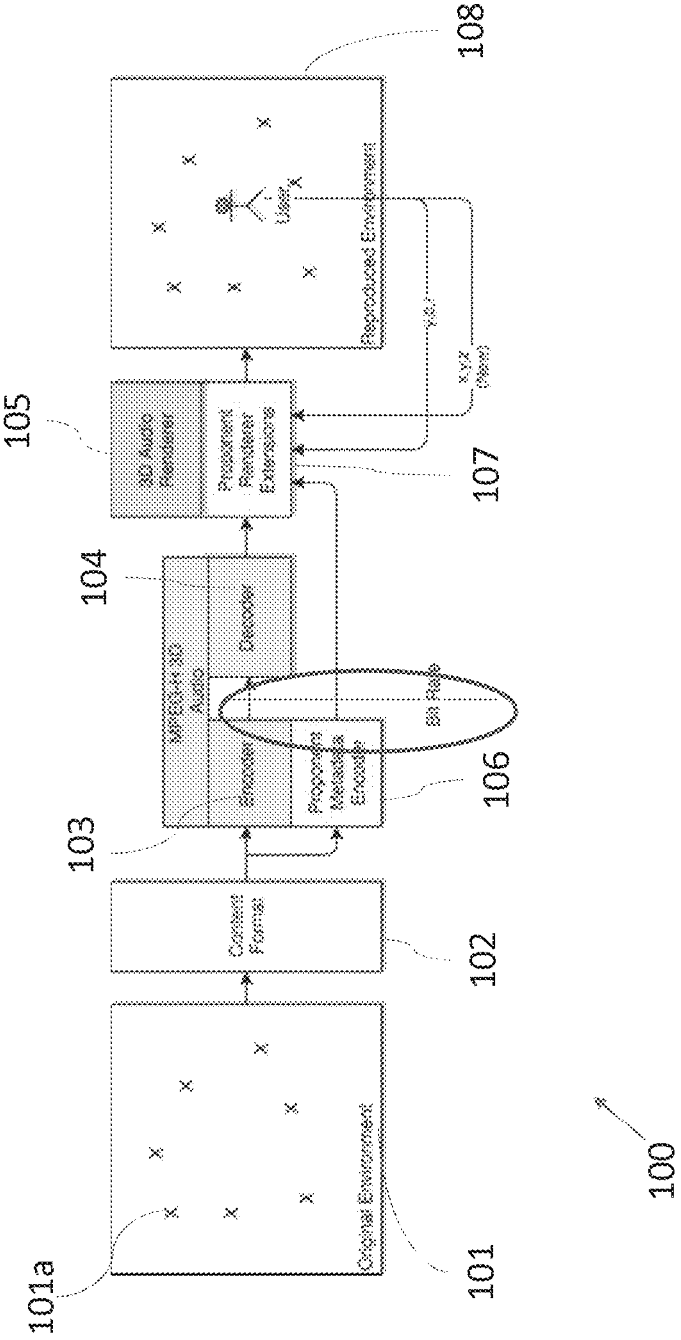

(60) Provisional application No. 62/655,990, filed on Apr. 11, 2018.

(51) Int. Cl.
*G10L 19/16* (2013.01)
*H04S 3/00* (2006.01)

(52) U.S. Cl.
CPC ....... *H04S 2400/01* (2013.01); *H04S 2400/11* (2013.01)

(58) Field of Classification Search
USPC ........................ 381/310, 306, 22, 23; 700/94
See application file for complete search history.

(56) References Cited

U.S. PATENT DOCUMENTS

| | | | | |
|---|---|---|---|---|
| 9,860,669 | B2 | 1/2018 | De Bruijn | |
| 9,875,745 | B2 | 1/2018 | Peters | |
| 10,650,590 | B1 * | 5/2020 | Topiwala | H04L 67/61 |
| 11,232,643 | B1 | 1/2022 | Stevens | |
| 2010/0324915 | A1 | 12/2010 | Seo | |
| 2014/0023196 | A1 | 1/2014 | Xiang | |
| 2015/0149187 | A1 | 5/2015 | Kastner | |
| 2015/0213807 | A1 | 7/2015 | Breebaart | |
| 2015/0264484 | A1 | 9/2015 | Peters | |
| 2016/0104494 | A1 | 4/2016 | Kim | |
| 2017/0011750 | A1 | 1/2017 | Liu | |
| 2017/0110140 | A1 | 4/2017 | Peters | |
| 2017/0289720 | A1 | 10/2017 | Tsukagoshi | |
| 2017/0339469 | A1 * | 11/2017 | Trikannad | H04N 21/21805 |
| 2017/0366914 | A1 | 12/2017 | Stein | |
| 2018/0068664 | A1 | 3/2018 | Seo | |
| 2018/0075659 | A1 | 3/2018 | Browy | |
| 2019/0116440 | A1 * | 4/2019 | Peters | H04S 3/008 |
| 2019/0235729 | A1 | 8/2019 | Day | |
| 2019/0237044 | A1 | 8/2019 | Day | |
| 2020/0107147 | A1 * | 4/2020 | Munoz | H04S 3/008 |
| 2020/0228780 | A1 | 7/2020 | Kim | |
| 2021/0112287 | A1 | 4/2021 | Tungchin | |
| 2021/0168550 | A1 | 6/2021 | Terentiv | |

FOREIGN PATENT DOCUMENTS

| | | | |
|---|---|---|---|
| CN | 105191354 | A | 12/2015 |
| CN | 105612766 | A | 5/2016 |
| CN | 106463125 | B | 9/2020 |
| EP | 04123644 | A1 | 1/2023 |
| GB | 2567172 | A | 4/2019 |
| JO | 2020527746 | A | 9/2020 |
| RU | 2604337 | C2 | 12/2016 |
| RU | 2015151021 | A | 7/2017 |
| WO | 2007096808 | A1 | 8/2007 |
| WO | 2014124377 | A2 | 8/2014 |
| WO | 2014184706 | A1 | 11/2014 |
| WO | 2014194088 | A2 | 12/2014 |
| WO | 2015011015 | A1 | 1/2015 |
| WO | 2016204581 | A1 | 12/2016 |
| WO | 2017134214 | A1 | 8/2017 |
| WO | 2017218973 | A1 | 12/2017 |

OTHER PUBLICATIONS

Bleidt, R. et al "Development of the MPEG-H TV Audio System for ATSC 3.0" IEEE Transactions on Broadcasting, vol. 63, No. 1, Mar. 1, 2017, pp. 202-236.
Domanski, M. et al Immersive Visual Media-MPEG-1:360 Video, Virtual Navigation and Beyond, IEEE, May 22-24, 2017.
Herre, J. et al "Thoughts on MPEG-1 AR/VR Audio Evaluation" MPEG Meeting Jul. 2017, Motion Picture Expert Group or ISO/IEC JTC1/SC29/WG11.
ISO/IEC 23008-3 Information technology—High efficiency coding and media delivery in heterogeneous environments—Part 3: 3D audio; 2014.
Lafruit, G. et al Requirements on 6Dof (v1) Jul. 2017.
Murtaza, A. et al "ISO/MPEG-H3D Audio:SAOC 3D Decoding and Rendering" AES Convention, Oct. 23, 2015.
Yip, Eric "MPEG-1 Immersive Media-Towards an Immersive Media Era" Nov. 29, 2017.
Su Li, Wang Shitao, "Design of Video Encoder and Decoder Based on DM642," Journal of Wuhan University (National Science Edition), No. 6, Dec. 24, 2010.
Yang et al., "Present situation and development of 3D audio technology in virtual reality," Audio Engineering, No. 6, Jun. 17, 2017.
Michael Wozniewski, " A framework for interactive three-dimensional sound and spatial audio processing in a virtual environment," Thesis, Masters of Engineering, 2007, pp. 1-115.

* cited by examiner

METHODS, APPARATUS AND SYSTEMS FOR 6DOF AUDIO RENDERING AND DATA REPRESENTATIONS AND BITSTREAM STRUCTURES FOR 6DOF AUDIO RENDERING

RELATED APPLICATIONS

This is a continuation application of U.S. application Ser. No. 17/046,735 filed Oct. 9, 2020, which is a U.S. National Stage of International Application No. PCT/EP2019/058955, filed Apr. 9, 2019, which claims priority to U.S. Provisional Patent Application Ser. No. 62/655,990, filed on Apr. 11, 2018, each of which is hereby incorporated by reference in its entirety.

TECHNICAL FIELD

The present disclosure relates to providing an apparatus, system and method for Six Degrees of Freedom (6DoF) audio rendering, in particular in connection with data representations and bitstream structures for 6DoF audio rendering.

BACKGROUND

There is presently a lack of an adequate solution for rendering audio in combination with Six Degrees of Freedom (6DoF) movement of a user. While there are solutions for rendering channel-, object-, and First/Higher Order Ambisonics (HOA) signals in combination with Three Degrees of Freedom (3DoF) movement (yaw, pitch, roll), there is a lack of support for handling such signals in combination with Six Degrees of Freedom (6DoF) movement of the user (yaw, pitch, roll and translational movement).

In general, 3DoF audio rendering provides a sound field in which one or more audio sources are rendered at angular positions surrounding a pre-determined listener position, referred to as 3DoF position. One example of 3DoF audio rendering is included in the MPEG-H 3D Audio standard (abbreviated as MPEG-H 3DA).

While MPEG-H 3DA was developed to support channel, object, and HOA signals for 3DoF, it is not yet able to handle true 6DoF audio. The envisioned MPEG-I 3D audio implementation is desired to extend the 3DoF (and 3DoF+) functionality towards 6DoF 3D audio appliances in an efficient manner (preferably including efficient signal generation, encoding, decoding and/or rendering), while preferably providing 3DoF rendering backwards compatibility.

In view of the above, it is an object of the present disclosure to provide methods, apparatus and data representations and/or bitstream structures for 3D audio encoding and/or 3D audio rendering, which allow efficient 6DoF audio encoding and/or rending, preferably with backwards compatibility for 3DoF audio rendering, e.g., according to the MPEG-H 3DA standard.

It may be another object of the present disclosure to provide data representations and/or bitstream structures for 3D audio encoding and/or 3D audio rendering, which allow efficient 6DoF audio encoding and/or rending, preferably with backwards compatibility for 3DoF audio rendering, e.g. according to the MPEG-H 3DA standard, and encoding and/or rendering apparatus for efficient 6DoF audio encoding and/or rending, preferably with backwards compatibility for 3DoF audio rendering, e.g. according to the MPEG-H 3DA standard.

SUMMARY

According to exemplary aspects, there may be provided a method for encoding an audio signal into a bitstream, in particular at an encoder, the method comprising: encoding and/or including audio signal data associated with 3DoF audio rendering into one or more first bitstream parts of the bitstream; and/or encoding and/or including metadata associated with 6DoF audio rendering into one or more second bitstream parts of the bitstream.

According to exemplary aspects, the audio signal data associated with 3DoF audio rendering includes audio signal data of one or more audio objects.

According to exemplary aspects, the one or more audio objects are positioned on one or more spheres surrounding a default 3DoF listener position.

According to exemplary aspects, the audio signal data associated with 3DoF audio rendering includes directional data of one or more audio objects and/or distance data of one or more audio objects.

According to exemplary aspects, the metadata associated with 6DoF audio rendering is indicative of one or more default 3DoF listener positions.

According to exemplary aspects, the metadata associated with 6DoF audio rendering includes or is indicative of at least one of: a description of 6DoF space, optionally including object coordinates; audio object directions of one or more audio objects; a virtual reality (VR) environment; and/or parameters relating to distance attenuation, occlusion, and/or reverberations.

According to exemplary aspects, the method may further include: receiving audio signals from one or more audio sources; and/or generating the audio signal data associated with 3DoF audio rendering based on the audio signals from the one or more audio sources and a transform function.

According to exemplary aspects, the audio signal data associated with 3DoF audio rendering is generated by transforming the audio signals from the one or more audio sources into 3DoF audio signals using the transform function.

According to exemplary aspects, the transform function maps or projects the audio signals of the one or more audio sources onto respective audio objects positioned on one or more spheres surrounding a default 3DoF listener position.

According to exemplary aspects, the method may further include: determining a parametrization of the transform function based on environmental characteristics and/or parameters relating to distance attenuation, occlusion, and/or reverberations.

According to exemplary aspects, the bitstream is an MPEG-H 3D Audio bitstream or a bitstream using MPEG-H 3D Audio syntax.

According to exemplary aspects, the one or more first bitstream parts of the bitstream represent a payload of the bitstream, and/or the one or more second bitstream parts represent one or more extension containers of the bitstream.

According to yet another exemplary aspect, there may be provided a method for decoding and/or audio rendering, in particular at a decoder or audio renderer, the method comprising: receiving a bitstream which includes audio signal data associated with 3DoF audio rendering in one or more first bitstream parts of the bitstream and further including metadata associated with 6DoF audio rendering in one or more second bitstream parts of the bitstream, and/or performing at least one of 3DoF audio rendering and 6DoF audio rendering based on the received bitstream.

According to exemplary aspects, when performing 3DoF audio rendering, the 3DoF audio rendering is performed based on the audio signal data associated with 3DoF audio rendering in the one or more first bitstream parts of the bitstream, while discarding the metadata associated with 6DoF audio rendering in the one or more second bitstream parts of the bitstream.

According to exemplary aspects, when performing 6DoF audio rendering, the 6DoF audio rendering is performed based on the audio signal data associated with 3DoF audio rendering in the one or more first bitstream parts of the bitstream and the metadata associated with 6DoF audio rendering in the one or more second bitstream parts of the bitstream.

According to exemplary aspects, the audio signal data associated with 3DoF audio rendering includes audio signal data of one or more audio objects.

According to exemplary aspects, the one or more audio objects are positioned on one or more spheres surrounding a default 3DoF listener position.

According to exemplary aspects, the audio signal data associated with 3DoF audio rendering includes directional data of one or more audio objects and/or distance data of one or more audio objects.

According to exemplary aspects, the metadata associated with 6DoF audio rendering is indicative of one or more default 3DoF listener positions.

According to exemplary aspects, the metadata associated with 6DoF audio rendering includes or is indicative of at least one of: a description of 6DoF space, optionally including object coordinates; audio object directions of one or more audio objects; a virtual reality (VR) environment; and/or parameters relating to distance attenuation, occlusion, and/or reverberations.

According to exemplary aspects, the audio signal data associated with 3DoF audio rendering are generated based on the audio signals from the one or more audio sources and a transform function.

According to exemplary aspects, the audio signal data associated with 3DoF audio rendering is generated by transforming the audio signals from the one or more audio sources into 3DoF audio signals using the transform function.

According to exemplary aspects, the transform function maps or projects the audio signals of the one or more audio sources onto respective audio objects positioned on one or more spheres surrounding a default 3DoF listener position.

According to exemplary aspects, the bitstream is an MPEG-H 3D Audio bitstream or a bitstream using MPEG-H 3D Audio syntax.

According to exemplary aspects, the one or more first bitstream parts of the bitstream represent a payload of the bitstream, and/or the one or more second bitstream parts represent one or more extension containers of the bitstream.

According to exemplary aspects, performing 6DoF audio rendering, being based on the audio signal data associated with 3DoF audio rendering in the one or more first bitstream parts of the bitstream and the metadata associated with 6DoF audio rendering in the one or more second bitstream parts of the bitstream, includes generating audio signal data associated with 6DoF audio rendering based on the audio signal data associated with 3DoF audio rendering and an inverse transform function.

According to exemplary aspects, the audio signal data associated with 6DoF audio rendering is generated by transforming the audio signal data associated with 3DoF audio rendering using the inverse transform function and the metadata associated with 6DoF audio rendering.

According to exemplary aspects, the inverse transform function is an inverse function of a transform function which maps or projects audio signals of the one or more audio sources onto respective audio objects positioned on one or more spheres surrounding a default 3DoF listener position.

According to exemplary aspects, performing 3DoF audio rendering based on the audio signal data associated with 3DoF audio rendering in the one or more first bitstream parts of the bitstream results in the same generated sound field as performing 6DoF audio rendering, at a default 3DoF listener position, based on the audio signal data associated with 3DoF audio rendering in the one or more first bitstream parts of the bitstream and the metadata associated with 6DoF audio rendering in one or more second bitstream parts of the bitstream.

According to yet another exemplary aspect, there may be provided a bitstream for audio rendering, the bitstream including audio signal data associated with 3DoF audio rendering in one or more first bitstream parts of the bitstream and further including metadata associated with 6DoF audio rendering in one or more second bitstream parts of the bitstream. This aspect may be combined with any one or more of the above exemplary aspects.

According to yet another exemplary aspect, there may be provided an apparatus, in particular encoder, including a processor configured to: encode and/or include audio signal data associated with 3DoF audio rendering into one or more first bitstream parts of the bitstream; encode and/or include metadata associated with 6DoF audio rendering into one or more second bitstream parts of the bitstream; and/or output the encoded bitstream. This aspect may be combined with any one or more of the above exemplary aspects.

According to yet another exemplary aspect, there may be provided an apparatus, in particular decoder or audio renderer, including a processor configured to: receive a bitstream which includes audio signal data associated with 3DoF audio rendering in one or more first bitstream parts of the bitstream and further including metadata associated with 6DoF audio rendering in one or more second bitstream parts of the bitstream, and/or perform at least one of 3DoF audio rendering and 6DoF audio rendering based on the received bitstream. This aspect may be combined with any one or more of the above exemplary aspects.

According to exemplary aspects, when performing 3DoF audio rendering, the processor is configured to perform the 3DoF audio rendering based on the audio signal data associated with 3DoF audio rendering in the one or more first bitstream parts of the bitstream, while discarding the metadata associated with 6DoF audio rendering in the one or more second bitstream parts of the bitstream.

According to exemplary aspects, when performing 6DoF audio rendering, the processor is configured to perform the 6DoF audio rendering based on the audio signal data associated with 3DoF audio rendering in the one or more first bitstream parts of the bitstream and the metadata associated with 6DoF audio rendering in the one or more second bitstream parts of the bitstream.

According to yet another exemplary aspect, there may be provided a non-transitory computer program product including instructions that, when executed by a processor, cause the processor to execute a method for encoding an audio signal into a bitstream, in particular at an encoder, the method comprising: encoding or including audio signal data associated with 3DoF audio rendering into one or more first bitstream parts of the bitstream; and/or encoding or including metadata associated with 6DoF audio rendering into one or more second bitstream parts of the bitstream. This aspect may be combined with any one or more of the above exemplary aspects.

According to yet another exemplary aspect, there may be provided a non-transitory computer program product including instructions that, when executed by a processor, cause the processor to execute a method for decoding and/or audio rendering, in particular at a decoder or audio renderer, the method comprising: receiving a bitstream which includes audio signal data associated with 3DoF audio rendering in one or more first bitstream parts of the bitstream and further including metadata associated with 6DoF audio rendering in one or more second bitstream parts of the bitstream, and/or performing at least one of 3DoF audio rendering and 6DoF audio rendering based on the received bitstream. This aspect may be combined with any one or more of the above exemplary aspects.

Further aspects of the disclosure relate to corresponding computer programs and computer-readable storing media.

It will be appreciated that method steps and apparatus features may be interchanged in many ways. In particular, the details of the disclosed method can be implemented as an apparatus adapted to execute some or all or the steps of the method, and vice versa, as the skilled person will appreciate. In particular, it is understood that respective statements made with regard to the methods likewise apply to the corresponding apparatus, and vice versa.

SHORT DESCRIPTION OF FIGURES

Example embodiments of the disclosure are explained below with reference to the accompanying drawings, wherein like reference numbers may indicate like or similar elements, and wherein:

FIG. 1 schematically illustrates exemplary a system including MPEG-H 3D Audio decoder/encoder interfaces according to exemplary aspects of the present disclosure.

Figure 2:
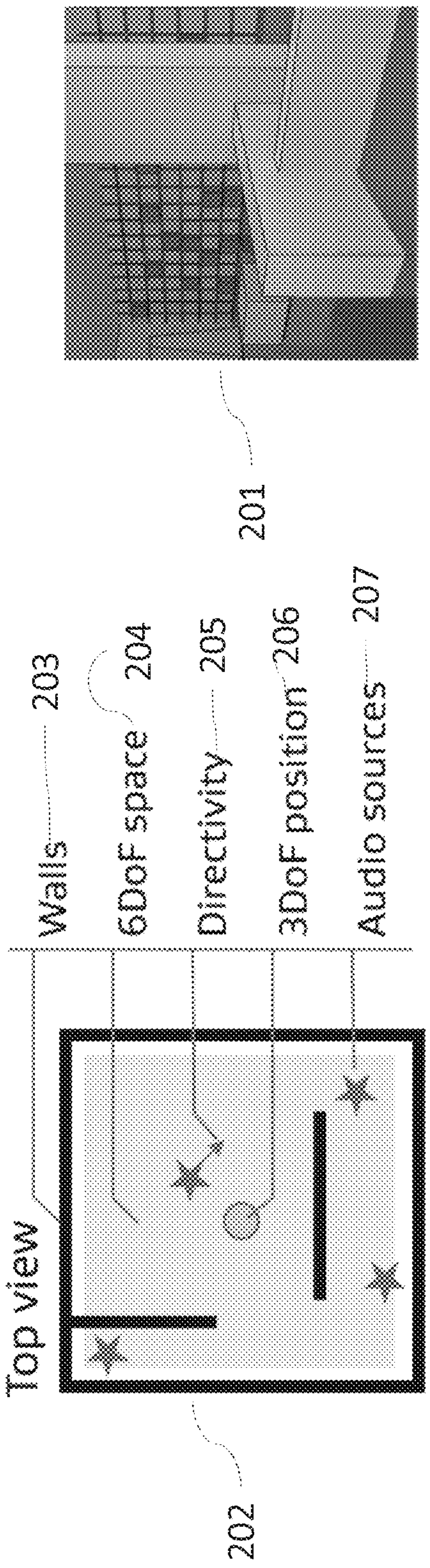

FIG. 2 schematically illustrates an exemplary top view of a 6DoF scene of a room (6DoF space).

Figure 3:
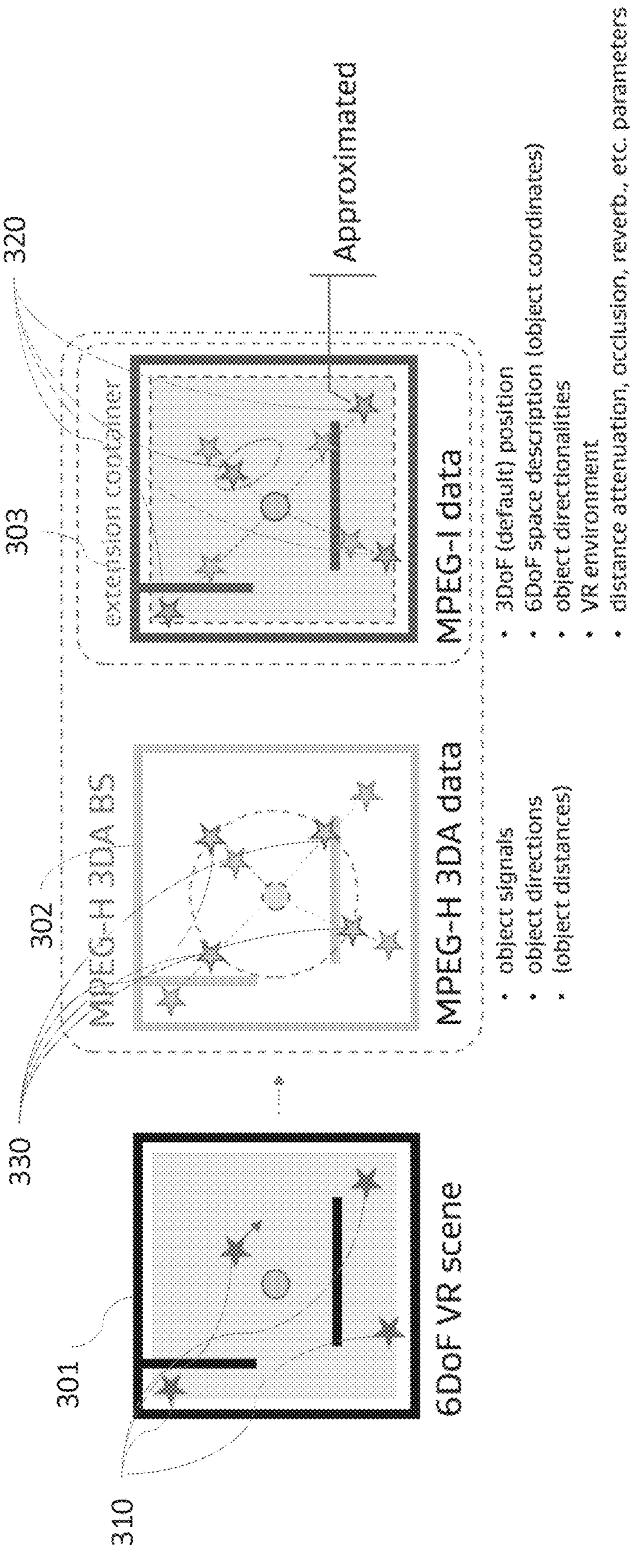

FIG. 3 schematically illustrates the exemplary top view of the 6DoF scene of FIG. 2 and 3DoF audio data and 6DoF extension metadata according to exemplary aspects of the present disclosure.

Figure 4A:
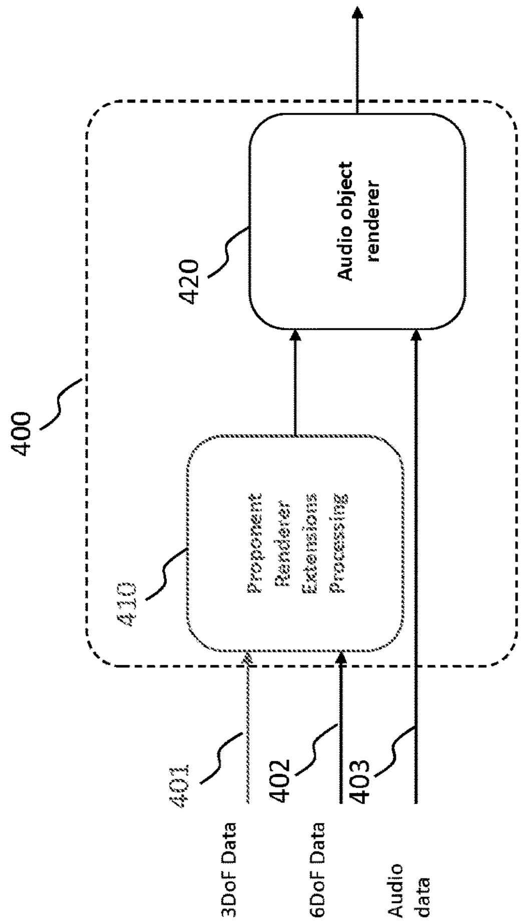

FIG. 4A schematically illustrates an exemplary system for processing 3DoF, 6DoF and audio data according to exemplary aspects of the present disclosure.

Figure 4B:
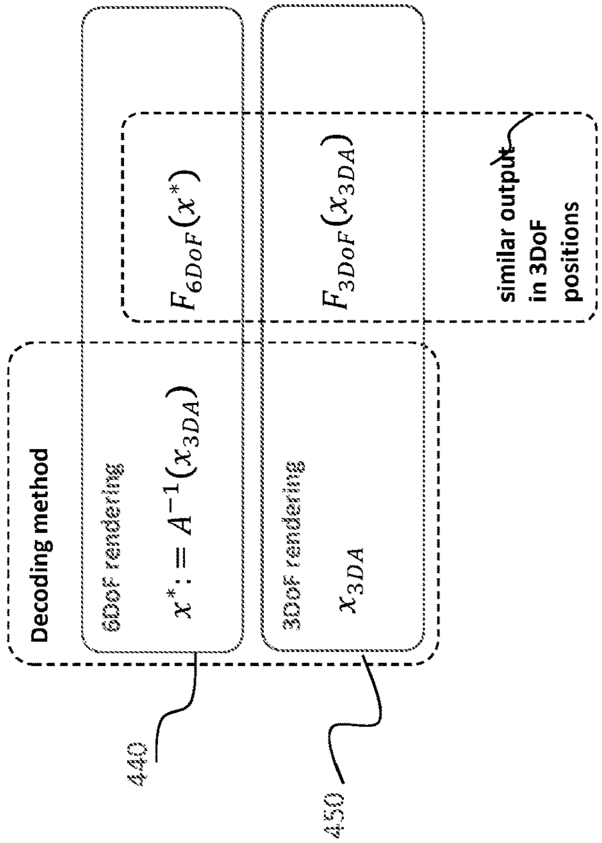

FIG. 4B schematically illustrates exemplary decoding and rendering methods for 6DoF audio rendering and 3DoF audio rendering according to exemplary aspects of the present disclosure.

Figure 5:
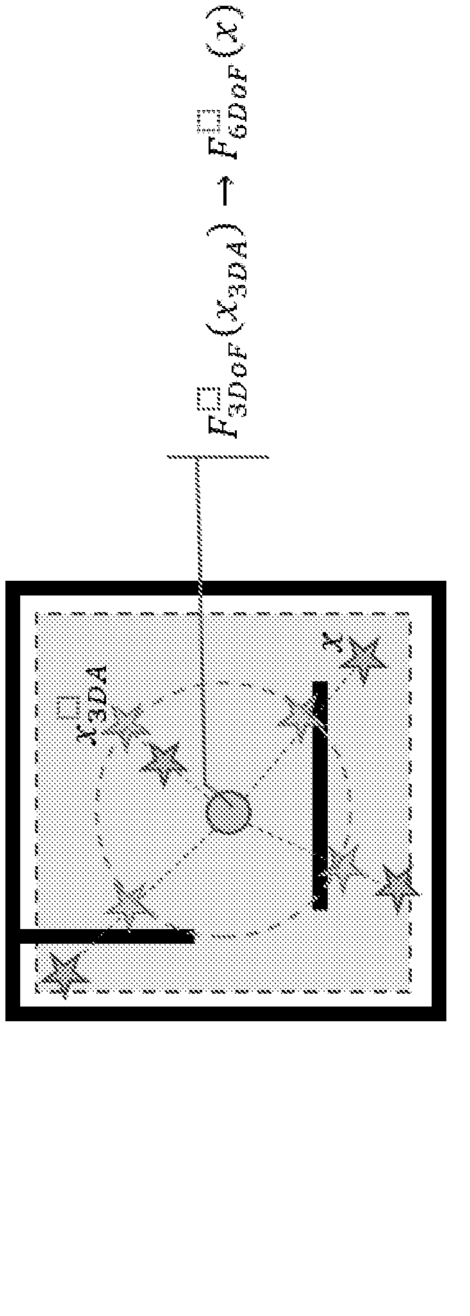

FIG. 5 schematically illustrates an exemplary a matching condition of 6DoF audio rendering and 3DoF audio rendering at a 3DoF position in a system in accordance with one or more of FIGS. 2 to 4B.

Figure 6A:
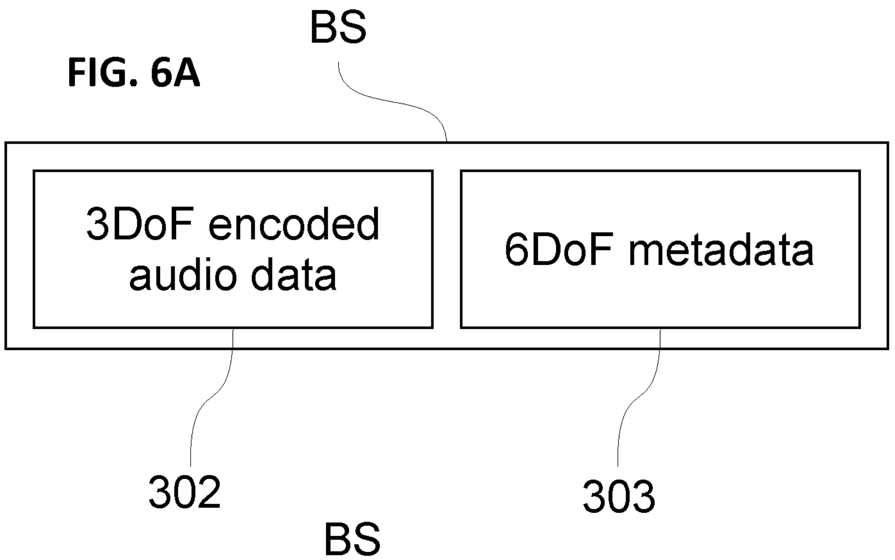

FIG. 6A schematically illustrates an exemplary data representation and/or bitstream structure according to exemplary aspects of the present disclosure.

Figure 6B:
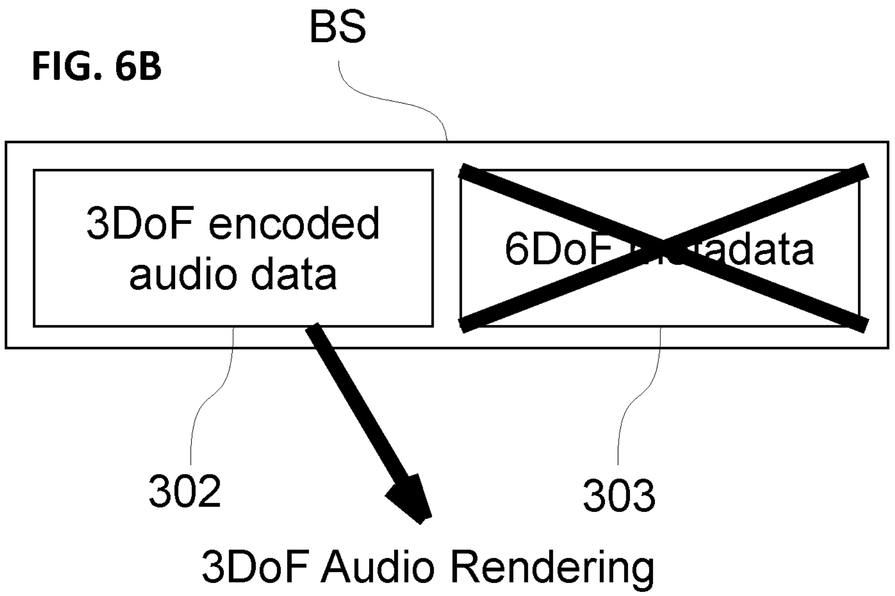

FIG. 6B schematically illustrates an exemplary 3DoF audio rendering based on the data representation and/or bitstream structure of FIG. 6A according to exemplary aspects of the present disclosure.

Figure 6C:
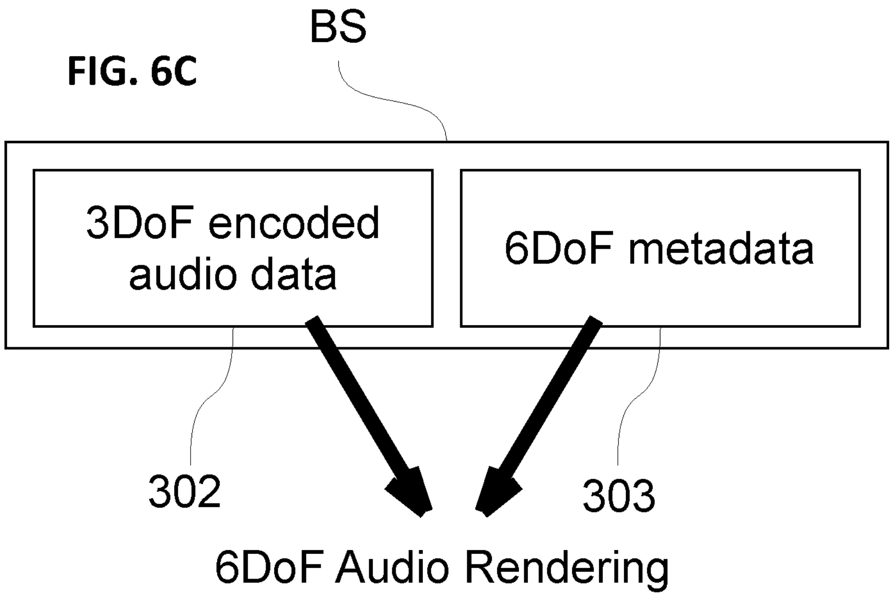

FIG. 6C schematically illustrates an exemplary 6DoF audio rendering based on the data representation and/or bitstream structure of FIG. 6A according to exemplary aspects of the present disclosure.

Figure 7A:
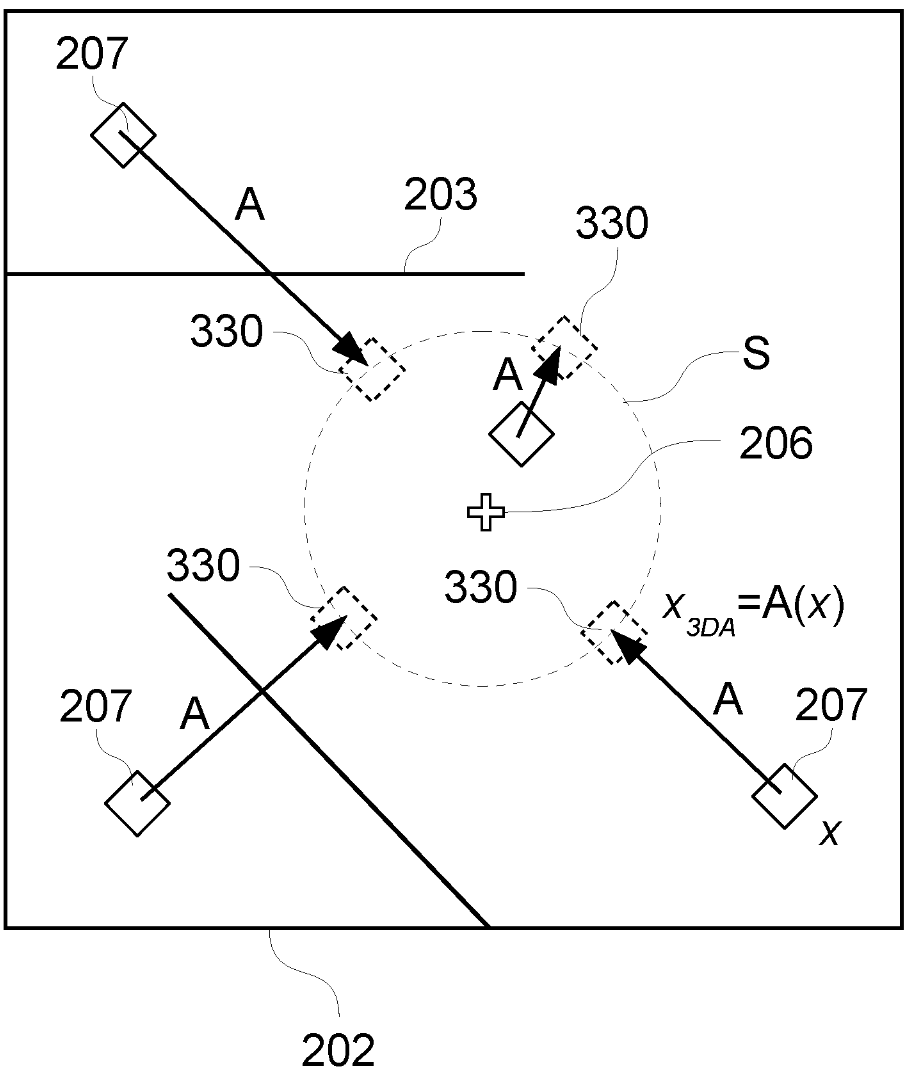

FIG. 7A schematically illustrates a 6DoF audio encoding transformation A based on 3DoF audio signal data according to exemplary aspects of the present disclosure.

Figure 7B:
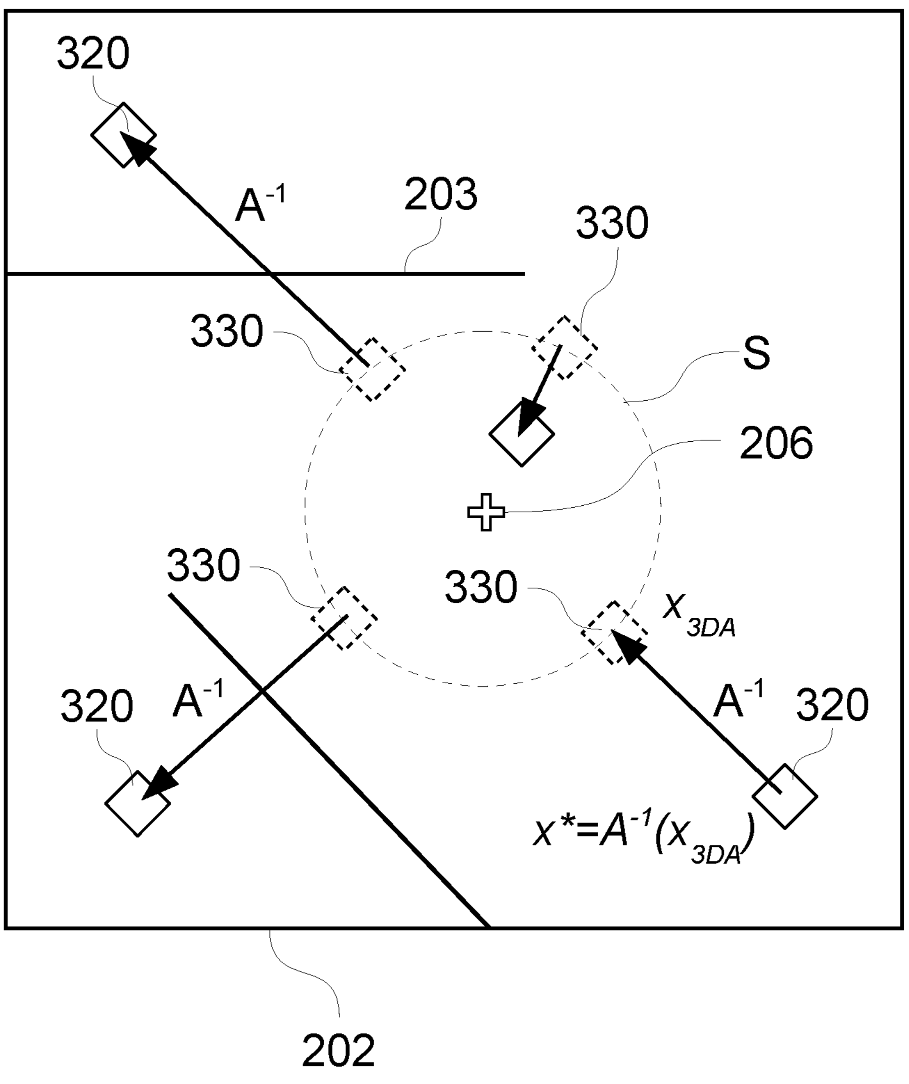

FIG. 7B schematically illustrates a 6DoF audio decoding transformation $A^{-1}$ for approximating/restoring 6DoF audio signal data based on 3DoF audio signal data according to exemplary aspects of the present disclosure.

Figure 7C:
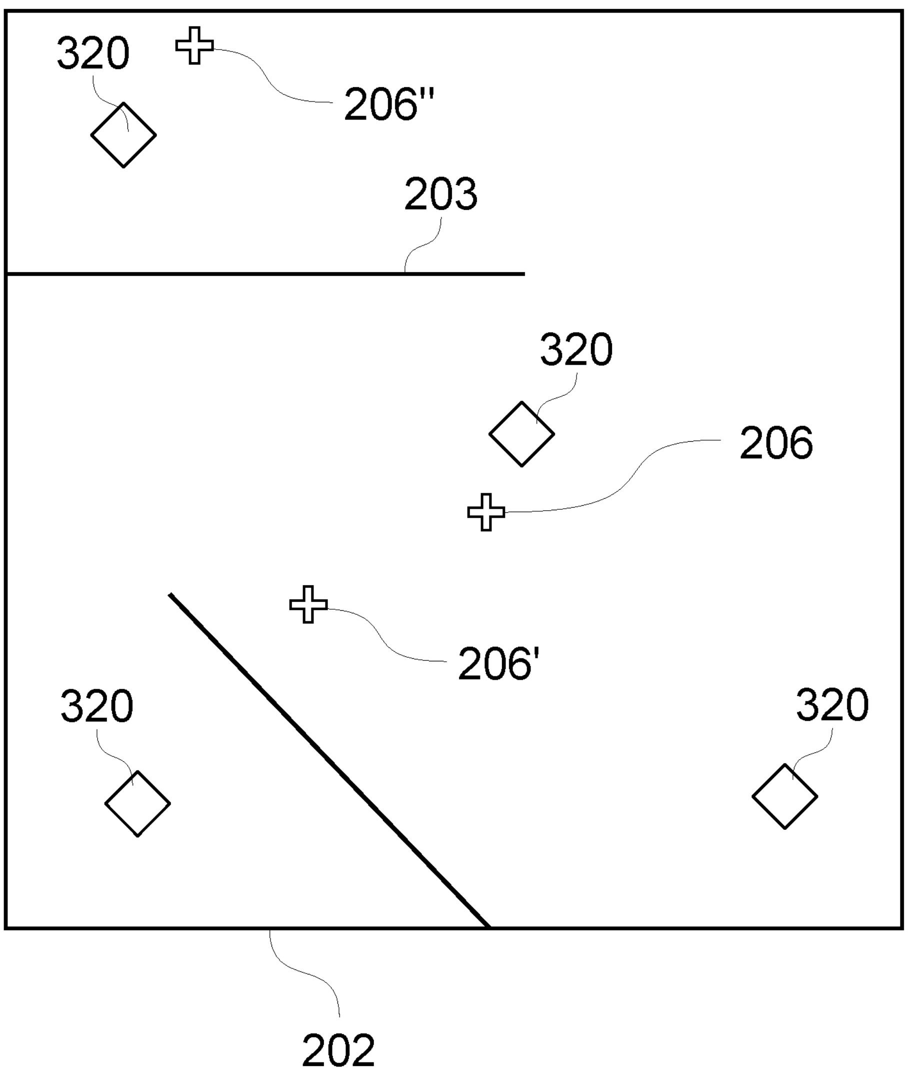

FIG. 7C schematically illustrates an exemplary 6DoF audio rendering based on the approximated/restored 6DoF audio signal data of FIG. 7B according to exemplary aspects of the present disclosure.

Figure 8:
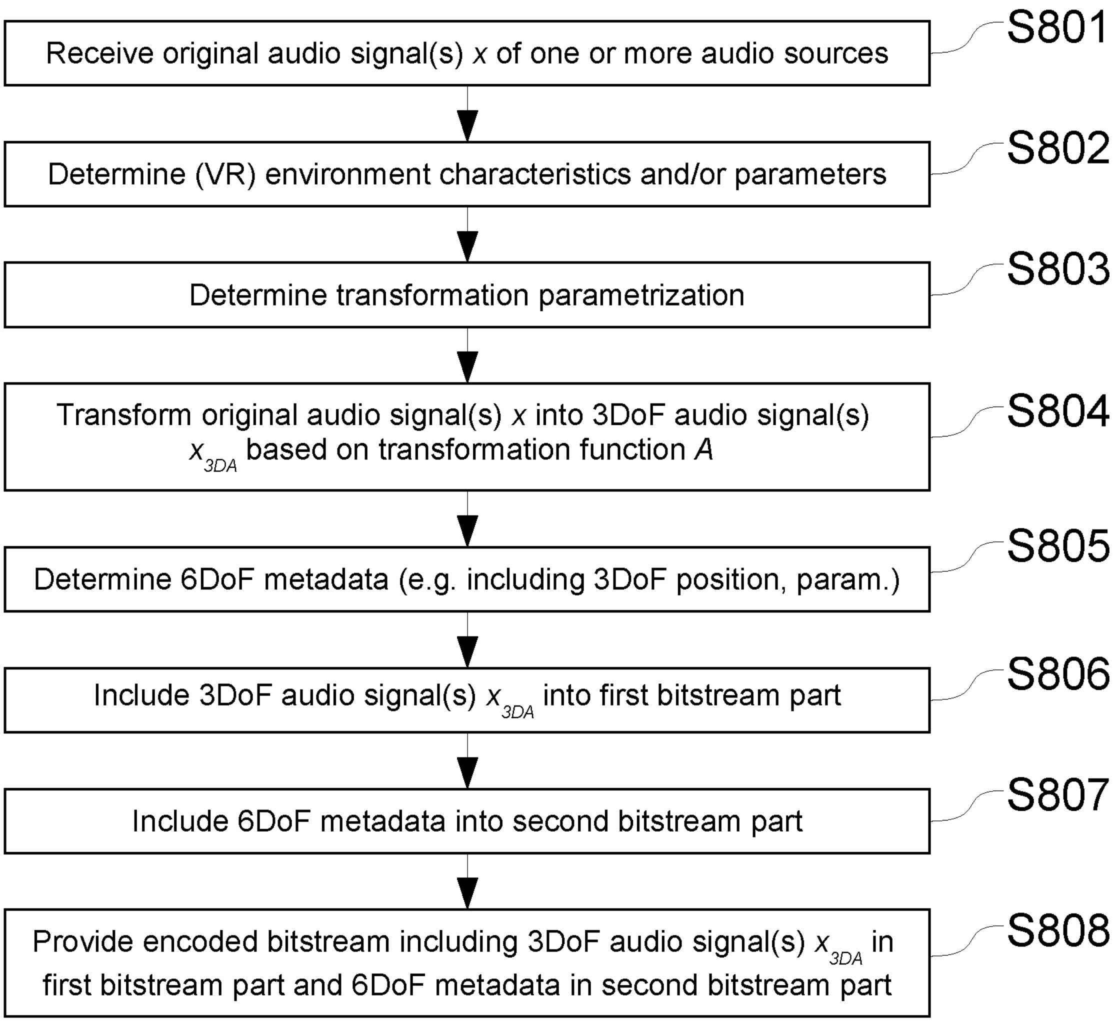

FIG. 8 schematically illustrates an exemplary flowchart of a method of 3DoF/6DoF bitstream encoding according to exemplary aspects of the present disclosure.

Figure 9:
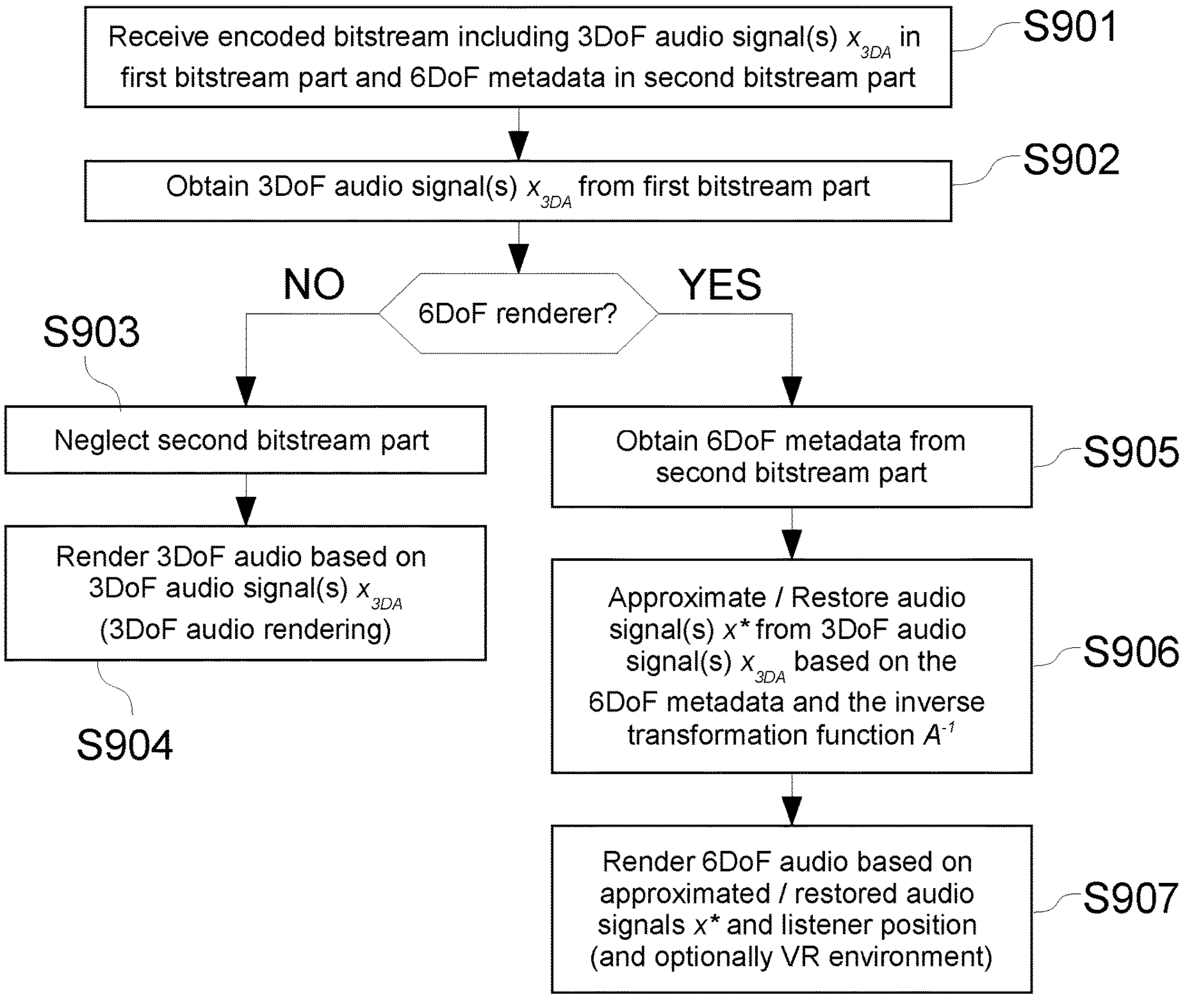

FIG. 9 schematically illustrates an exemplary flowchart of methods of 3DoF and/or 6DoF audio rendering according to exemplary aspects of the present disclosure.

DETAILED DESCRIPTION

In the following, preferred exemplary aspects will be described in more detail with reference to the accompanying figures. Same or similar features in different drawings and embodiments may be referred to by similar reference numerals. It is to be understood that the detailed description below relating to various preferred exemplary aspects is not to be meant as limiting the scope of the present invention.

As used herein, "MPEG-H 3D Audio" shall refer to the specification as standardized in ISO/IEC 23008-3 and/or any past and/or future amendments, editions or other versions thereof of the ISO/IEC 23008-3 standard.

As used herein, the MPEG-I 3D audio implementation is desired to extend the 3DoF (and 3DoF+) functionality towards 6DoF 3D audio, while preferably providing 3DoF rendering backwards compatibility.

As used herein, 3DoF is typically a system that can correctly handle a user's head movement, in particular head rotation, specified with three parameters (e.g., yaw, pitch, roll). Such systems often are available in various gaming systems, such as Virtual Reality (VR)/Augmented Reality (AR)/Mixed Reality (MR) systems, or other such type acoustic environments.

As used herein, 6DoF is typically a system that can correctly handle 3DoF and translational movement.

Exemplary aspects of the present disclosure relate to an audio system (e.g., an audio system that is compatible with the MPEG-I audio standard), where the audio renderer extends functionality towards 6DoF by converting related metadata to a 3DoF format, such as an audio renderer input format that is compatible with an MPEG standard (e.g., the MPEG-H 3DA standard).

FIG. 1 illustrates an exemplary system 100 that is configured to use metadata extensions and/or audio renderer extensions in addition to existing 3DoF systems, in order to enable 6DoF experiences. The system 100 includes an original environment 101 (which may exemplarily include one or more audio sources 101*a*), a content format 102 (e.g. a bitstream including 3D audio data), an encoder 103, and proposed metadata encoder extension 106. The system 100 may also include a 3D audio renderer 105 (e.g. a 3DoF renderer), and proponent renderer extensions 107 (e.g., 6DoF renderer extensions for a reproduced environment 108).

In a method of 3D audio rendering with 3DoF, only angles (e.g. yaw angle y, pitch angle p, roll angle r) of a user's angular orientation at a pre-determined 3DoF position may be input to the 3DoF audio renderer 105. With extended 6DoF functionality, the user's location coordinates (e.g. x, y and z) may additionally be input to the 6DoF audio renderer (extension renderer).

An advantage of the present disclosure includes bit rate improvements for the bitstream transmitted between the encoder and the decoder. The bit stream may be encoded and/or decoded in compliance with a standard, e.g., the MPEG-I Audio standard and/or the MPEG-H 3D Audio standard, or at least backwards compatible with a standard such as with the MPEG-H 3D Audio standard.

In some examples, exemplary aspects of the present disclosure are directed to processing of a single bitstream (e.g., an MPEG-H 3D Audio (3DA) bitstream (BS) or a bitstream that uses syntax of an MPEG-H 3DA BS) that is compatible with a plurality of systems.

For example, in some exemplary aspects, the audio bitstream may be compatible with two or more different renderers, e.g., a 3DoF audio renderer that may be compatible with one standard, (e.g., the MPEG-H 3D Audio standard) and a newly defined 6DoF audio renderer or renderer extension that may be compatible with a second, different standard (e.g., the MPEG-I Audio standard).

Exemplary aspects of the present disclosure are directed to different decoders configured to perform decoding and rendering of the same audio bitstream, preferably in order to produce the same audio output.

For example, exemplary aspects of the present disclosure relate to a 3DoF decoder and/or 3DoF renderer and/or a 6DoF decoder and/or 6DoF renderer configured to produce the same output for the same bitstream (e.g., a 3DA BS or bitstream using the 3DA BS). Exemplarily, the bitstream may include information regarding defined positions of a listener in VR/AR/MR (virtual reality/augmented reality/mixed reality) space, e.g., as part of 6DoF metadata.

The present disclosure exemplarily further relates to encoders and/or decoders configured to encode and/or decode, respectively, 6DoF information (e.g., compatible with an MPEG-I Audio environment), wherein such encoders and/or decoders of the present disclosure provide one or more of the following advantages:

- quality- and bitrate-efficient representations of the VR/AR/MR related audio data and its encapsulation into audio bitstream syntax (e.g., MPEG-H 3D Audio BS);
- backwards compatibility between various systems (e.g., the MPEG-H 3DA standard and an envisioned MPEG-I Audio standard).

In order to preferably avoid competition between 3DoF- and 6DoF-solutions and to provide a smooth transition between present and future technologies, backwards compatibility is highly beneficial.

For example, backwards compatibility between a 3DoF audio system and a 6DoF audio system may be highly beneficial, such as providing, in a 6DoF audio system, such as MPEG-I Audio, backwards compatibility to a 3DoF audio system, such as MPEG-H 3D Audio According to exemplary aspects of the present disclosure, this can be realized by providing backward compatibility, e.g., on a bitstream level, for 6DoF-related systems consisting of:

- 3DoF audio material coded data and related metadata; and
- 6DoF related metadata.

Exemplary aspects of the present disclosure relate to a standard 3DoF bitstream syntax, such as a first type of audio bitstream (e.g., MPEG-H 3DA BS) syntax, that encapsulates 6DoF bitstream elements, such as MPEG-I Audio bitstream elements, e.g. in one or more extension containers of the first type of audio bitstream (e.g., MPEG-H 3DA BS).

In order to provide a system that ensures backwards compatibility on a performance level, the following systems and/or structures may be relevant and may occur:

1a. A 3DoF system (e.g., systems that are compatible with standards of MPEG-H 3DA) shall be able to ignore all 6DoF-related syntax elements (e.g., ignoring MPEG-I Audio bitstream syntax elements based on functionality of "mpegh3daExtElementConfig( )" or "mpegh3daExtElement( )" of an MPEG-H 3D Audio bitstream syntax), i.e. the 3DoF system (decoder/renderer) may preferably be configured to neglect additional 6DoF-related data and/or metadata (for example by not reading the 6DoF-related data and/or metadata); and 2a. The remaining part of the bitstream payload (e.g., MPEG-I Audio bitstream payload containing data and/or metadata compatible with a MPEG-H 3DA bitstream parser) shall be decodable by the 3DoF system (e.g., a legacy MPEG-H 3DA system) in order to produce desired audio output, i.e. the 3DoF system (decoder/renderer) may preferably be configured to decode the 3DoF part of the BS; and 3a. The 6DoF system (e.g., the MPEG-I Audio system) shall be able to process both the 3DoF-related and 6DoF-related parts of an audio bitstream and produce audio output that matches the audio output of the 3DoF system (e.g., of MPEG-H 3DA systems) at pre-defined backwards compatible 3DoF position(s) in VR/AR/MR space, i.e. the 6DoF system (decoder/renderer) may preferably be configured to render, at the default 3DoF position(s), the sound field/audio output that matches the 3DoF rendered sound field/audio output; and 4a. The 6DoF system (e.g., the MPEG-I Audio system) shall provide a smooth change (transition) of the audio output around the pre-defined backwards compatible 3DoF position(s), (i.e., providing a continuous sound-field in a 6DoF space), i.e. the 6DoF system (decoder/renderer) may preferably be configured to render, in the surroundings of the default 3DoF position(s), the sound field/audio output that smoothly transitions, at the default 3DoF position(s), into the 3DoF rendered sound field/audio output.

In some examples, the present disclosure relates to providing a 6DoF audio renderer (e.g., a MPEG-I Audio renderer) that produces the same audio output as a 3DoF audio renderer (e.g., a MPEG-H 3D Audio renderer) in one, more, or some 3DoF position(s).

Presently, there are drawbacks when directly transporting 3DoF-related audio signals and metadata directly to a 6DoF audio system, which include:

1. Bitrate increase (i.e., the 3DoF-related audio signals and metadata are sent in addition to the 6DoF-related audio signals and metadata); and
2. Limited validity (i.e., the 3DoF-related audio signal(s) and metadata are only valid for 3DoF position(s)).

Exemplary aspects of the present disclosure relate to overcoming the above drawbacks.

In some examples, the present disclosure is directed to:

1. using 3DoF-compatible audio signal(s) and metadata (e.g., signals and metadata compatible to MPEG-H 3D Audio) instead of (or as a complimentary addition to) the original audio source signals and metadata; and/or
2. increasing the range of applicability (usage for 6DoF rendering) from 3DoF position(s) to 6DoF space (defined by a content creator), while preserving a high level of sound field approximation.

Exemplary aspects of the present disclosure are directed to efficiently generating, encoding, decoding and rendering such signal(s) in order to fulfil these goals and to provide 6DoF rendering functionality.

FIG. 2 illustrates an exemplary top view 202 of an exemplary room 201. As shown in FIG. 2, an exemplary listener is standing in the middle of the room with several audio sources and non-trivial wall geometries. In 6DoF appliances (e.g., systems that provide for 6DoF capabilities), the exemplary listener can move around, but it is assumed in some examples that the default 3DoF position 206 may correspond to the intended region of the best VR/AR/MR audio experience (e.g. according to a setting by or intention of a content creator).

In particular, FIG. 2 exemplary illustrates walls 203, a 6DoF space 204, exemplary (optional) directivity vectors 205 (e.g. if one or more sound sources directionally emit(s) sound), a 3DoF listener position 206 (default 3DoF position 206) and audio sources 207 that are exemplarily illustrated star shaped in FIG. 2.

FIG. 3 illustrates an exemplary 6DoF VR/AR/MR scene e.g. as in FIG. 2, as well as audio objects (audio data+metadata) 320 contained in a 3DoF audio bitstream 302 (e.g., such as a MPEG-H 3D Audio bitstream) and an extension container 303. The audio bitstream 302 and extension container 303 may be encoded via an apparatus or system (e.g., software, hardware or via the cloud) that is compatible with an MPEG standard (e.g., MPEG-H or MPEG-I)

Exemplary aspects of the present disclosure relate to recreating the sound field, when using a 6DoF audio renderer (e.g., a MPEG-I Audio renderer), in a "3DoF position" in a way that corresponds to a 3DoF audio renderer (e.g., a MPEG-H Audio renderer) output signal (that may or may not be consistent to physical law sound propagation). This sound field should preferably be based on the original "audio sources" and reflect the influence of the complex geometries of the corresponding VR/AR/MR environment (e.g., effect of "walls", structures, sound reflections, reverberations, and/or occlusions, etc.).

Exemplary aspects of the present disclosure relate to parametrization by an encoder of all relevant information describing this scenario in a way to ensure fulfilment of one, more, or preferably all corresponding requirements (1a)-(4a) described above.

If two audio rendering modes are ran (i.e., 3DoF and 6DoF) in parallel and an interpolation algorithm is applied to the corresponding outputs in 6DoF space, such an approach would be sub-optimal because it would require:

- parallel execution of two distinct rendering algorithms (i.e. one for a specific 3DoF positions and one for the 6DoF space);
- a large amount of audio data (for transporting additional audio data for a 3DoF Audio renderer).

Exemplary aspects of the present disclosure avoid the drawbacks of the above, in that preferably only a single audio rendering mode is executed (e.g. instead of parallel execution of two audio rendering modes) and/or 3DoF audio data is preferably used for the 6DoF audio rendering with additional metadata for restoring and/or approximating the original sound source(s) signal(s) (e.g. instead of transmitting the 3DoF Audio data and the original sound source(s) data).

Exemplary aspects of the present disclosure relate to (1) a single 6DoF Audio rendering algorithm (e.g., compatible with MPEG-I Audio) that preferably produces exactly the same output as a 3DoF Audio rendering algorithm (e.g., compatible with MPEG-H 3DA) at specific position(s) and/or (2) representing the audio (e.g. 3DoF audio data) and 6DoF related audio metadata to minimize redundancy in 3DoF- and VR/AR/MR-related parts of a 6DoF Audio bitstream data (e.g., a MPEG-I Audio bitstream data).

Exemplary aspects of the present disclosure relate to using a first standardized format bitstream (e.g., MPEG-H 3DA BS) syntax to encapsulate a second standardized format bitstream (e.g., future standards e.g., MPEG-I) or parts thereof and 6DoF related metadata to:

- transport (e.g. in the core part of the 3DoF audio bitstream syntax) the audio source signals and metadata that, preferably as being decoded by a 3DoF audio system, which preferably sufficiently well approximate the desired sound field in the (default) 3DoF position(s); and
- transport (e.g. in the extension part of the 3DoF audio bitstream syntax) the 6DoF related metadata and/or further data (e.g. parametric or/and signal data) that is used to approximate (restore) the original audio source signals for 6DoF audio rendering.

An aspect of the present disclosure relates to a determination of desired "3DoF position(s)" and 3DoF audio system (e.g. MPEG-H 3DA system) compatible signals at an encoder side.

For example, as shown relative to FIG. 3, virtual 3DA object signals for 3DA may produce the same sound field in a specific 3DoF position (based on signals $x_{3DA}$) that should preferably contain the effects of the VR environment for the specific 3DoF position(s) ("wet" signals), since some 3DoF systems (such as the MPEG-H 3DA system) cannot account for VR/AR/MR environmental effects (e.g., occlusion, reverb, etc.). The methods and processes illustrated in FIG. 3 may be performed via a variety of systems and/or products.

The inverse function $A^{-1}$ should, in some exemplary aspects, preferably "un-wet" (i.e. removing the effects of VR environment) these signals should be good as it is necessary for approximating the original "dry" signals x (which are free from the effects of VR environment).

The audio signal(s) for 3DoF rendering (($x_{3DA}$)) may preferably be defined in order to provide the same/similar output for both 3DoF and 6DoF audio renderings e.g., based on:

$$F_{3DoF}(x_{3DA}) \rightarrow F_{6DOF}(x) \text{ for } 3DoF \qquad \text{Equation No. (1)}$$

The audio objects may be contained in a standardized bit stream. This bit stream may be encoded in compliance with a variety of standards, such as MPEG-H 3DA and/or MPEG-I.

The BS may include information regarding object signals, object directions, and object distances.

FIG. 3 further exemplarily illustrates an extension container 303 that may contain extension metadata, e.g. in the BS. The extension container 303 of the BS may include at least one of the following metadata: (i) 3DoF (default) position parameters; (ii) 6DoF space description parameters (object coordinates); (iii) (optional) object directionality parameters; (iv) (optional) VR/AR/MR environment parameters; and/or (v) (optional) distance attenuation parameters, occlusion parameters, and/or reverberation parameters, etc.

There may be an approximation of the desired audio rendering included, based on:

$$F_{6DoF}(x^*) \approx F_{6DOF}(x) \text{ for } 6DoF \quad \text{Equation No. (2)}$$

The approximation may be based on the VR environment, wherein environment characteristics may be included in the extension container metadata.

Additionally or optionally, smoothness for a 6DoF audio renderer (e.g. MPEG-I Audio renderer) output may be provided, preferably based on:

$$F_{6DoF} \subset G^{i \geq 0} \text{ for } 3DoF+, G^{i \geq 0}\text{–geometric continuity class} \quad \text{Equation No. (3)}$$

Exemplary aspects of the present disclosure are directed to defining 3DoF audio objects (e.g. MPEG-H 3DA objects) on the encoder side, preferably based on:

$$x_{3DA} := A(x), \| F_{3DoF}(x_{3DA}) - F_{6DOF}(x) \text{ for } 3DoF \| \rightarrow \min \quad \text{Equation No. (4)}$$

An aspect of the present disclosure relates to recovering of the original objects on the decoder based on:

$$x^* := A^{-1}(x_{3DA}) \quad \text{Equation No. (5)}$$

wherein, x relates to sound source/object signals, x* relates to an approximation of sound source/object signals, F(x) for 3DoF/for 6DoF relates to an audio rendering function for 3DoF/6DoF listener position(s), 3DoF relates to a given reference compatibility position(s)∈6DoF space; 6DoF relates to arbitrary allowed position(s)∈VR scene;

- $F_{6FoF}$ (x) relates to decoder specified 6DoF Audio rendering (e.g. MPEG-I Audio rendering);
- $F_{3DoF}(x_{3DA})$ relates to a decoder specified 3DoF rendering (e.g., MPEG-H 3DA rendering); and
- A, $A^{-1}$ relate to a function (A) approximating signals $x_{3DA}$ based on the signals x and its inverse ($A^{-1}$).

The approximated sound sources/object signals are preferably recreated using a 6DoF audio renderer in a "3DoF position" in a way that corresponds to a 3DoF audio renderer output signal.

The sound sources/object signals are preferably approximated based on a sound field that is based on the original "audio sources" and reflects the influence of the complex geometries of the corresponding VR/AR/MR environment (e.g., "walls", structures, reverberations, occlusions, etc.).

That is, virtual 3DA object signals for 3DA preferably produce the same sound field in a specific 3DoF position (based on signals $x_{3DA}$) that contain the effects of the VR environment for the specific 3DoF position(s).

The following may be available on the rendering side (e.g., to a decoder that is compliant with a standard such as the MPEG-H or MPEG-I standards):

- audio signal(s) for 3DoF Audio rendering: $x_{3DA}$
- either 3DoF or 6DoF Audio rendering functionality:

$$F_{3DoF}(x_{3DA}) \text{ or } F_{6DOF}(x) \quad \text{Equation No. (6)}$$

For 6DoF Audio rendering, additionally there may be 6DoF metadata available at the rendering side for the 6DoF Audio rendering functionality (e.g. to approximate/restore the audio signals x of the one or more audio sources, e.g. based on the 3DoF audio signals $x_{3DA}$ and the 6DoF metadata.

Exemplary aspects of the present disclosure relates to (i) definition of the 3DoF audio objects (e.g. MPEG-H 3DA objects) and/or (ii) recovery (approximation) of the original audio objects.

The audio objects may exemplarily be contained in a 3DoF audio bitstream (such as MPEG-H 3DA BS).

The bitstream may include information regarding object audio signals, object directions, and/or object distances.

An extension container (e.g. of the bitstream such as the MPEG-H 3DA BS) may include at least one of the following metadata: (i) 3DoF (default) position parameters; (ii) 6DoF space description parameters (object coordinates); (iii) (optional) object directionality parameters; (iv) (optional) VR/AR/MR environment parameters; and/or (v) (optional) distance attenuation parameters, occlusion parameters, reverberation parameters, etc.

The present disclosure may provide the following advantages:

- Backwards compatibility to 3DoF audio decoding and rendering (e.g. MPEG-H 3DA decoding and rendering): the 6DoF Audio renderer (e.g. MPEG-I Audio renderer) output corresponds to the 3DoF rendering output of a 3DoF rendering engine (e.g. MPEG-H 3DA rendering engine) for the pre-determined 3DoF position(s).
- Coding efficiency: for this approach the legacy 3DoF audio bitstream syntax (e.g. MPEG-H 3DA bitstream syntax) structure can be efficiently re-used.
- Audio quality control at the pre-determined (3DoF) position(s): the best perceptual audio quality can be explicitly ensured by the encoder for any arbitrary position(s) and the corresponding 6DoF space.

Exemplary aspects of the present disclosure may relate to the following signaling in a format compatible with an MPEG standard (e.g. the MPEG-I standard) bitstream:

- Implicit 3DoF Audio system (e.g. MPEG-H 3DA) compatibility signaling via an extension container mechanism (e.g., MPEG-H 3DA BS), which enables a 6DoF Audio (e.g., MPEG-I Audio compatible) processing algorithm to recover the original audio object signals.
- Parametrization describing the data for approximation of the original audio object signals.

A 6DoF Audio renderer may specify how to recover the original audio object signals e.g., in an MPEG compatible system (e.g., MPEG-I Audio system).

This proposed concept:

- is generic in respect to the definition of the approximation function (i.e. A(x));
- can be arbitrarily complex, but at the decoder side the corresponding approximation should exist (i.e. $\exists A^{-1}$);
- approximately be mathematically "well-defined" (e.g. algorithmically stable, etc.);
- is generic in terms of types of the approximation function (i.e. A(x));
- the approximation function may be based on the following approximation types or any combination of these approaches (listed in order of bitrate consumption increase):
  - parametrized audio effect(s) applied for the signal $x_{3DA}$ (e.g. parametrically controlled level, reverberation, reflection, occlusion, etc.)
  - parametrically coded modification(s) (e.g. time/frequency variant modification gains for the transmitted signal $x_{3DA}$)—
  - signal coded modification(s) (e.g. coded signals approximating residual waveform $(x-x_{3DA})$); and
- is extendable and applicable to generic sound field and sound sources representations (and their combinations): objects, channels, FOA, HOA.

FIG. 6A schematically illustrates an exemplary data representation and/or bitstream structure according to exemplary aspects of the present disclosure. The data representation and/or bitstream structure may have been encoded via an apparatus or system (e.g., software, hardware or via the cloud) that is compatible with an MPEG standard (e.g., MPEG-H or MPEG-I).

The bitstream BS exemplarily includes a first bitstream part 302 which includes 3DoF encoded audio data (e.g. in a main part or core part of the bitstream). Preferably, the bitstream syntax of the bitstream BS is compatible or compliant with a BS syntax of 3DoF audio rendering, such as e.g. an MPEG-H 3DA bitstream syntax. The 3DoF encoded audio data may be included as payload in one or more packets of the bitstream BS.

As previously described e.g. in connection with FIG. 3 above, the 3DoF encoded audio data may include audio object signals of one or more audio objects (e.g. on a sphere around a default 3DoF position). For directional audio objects, the 3DoF encoded audio data may further optionally include object directions, and/or optionally further be indicative of object distances (e.g. by use of a gain and/or one or more attenuation parameters).

Exemplarily, the BS exemplarily includes a second bitstream part 303 which includes 6DoF metadata for 6DoF audio encoding (e.g. in a metadata part or extension part of the bitstream). Preferably, the bitstream syntax of the bitstream BS is compatible or compliant with a BS syntax of 3DoF audio rendering, such as e.g. an MPEG-H 3DA bitstream syntax. The 6DoF metadata may be included as extension metadata in one or more packets of the bitstream BS (e.g. in one or more extension containers, which are e.g. already provided by the MPEG-H 3DA bitstream structure).

As previously described e.g. in connection with FIG. 3 above, the 6DoF metadata may include position data (e.g. coordinate(s)) of one or more 3DoF (default) positions, further optionally a 6DoF space description (e.g. object coordinates), further optionally object directionalities, further optionally metadata describing and/or parametrizing a VR environment, and/or further optionally include parametrization information and/or parameters on attenuation, occlusions, and/or reverberations, etc.

FIG. 6B schematically illustrates an exemplary 3DoF audio rendering based on the data representation and/or bitstream structure of FIG. 6A according to exemplary aspects of the present disclosure. As in FIG. 6*a*, the data representation and/or bitstream structure may have been encoded via an apparatus or system (e.g., software, hardware or via the cloud) that is compatible with an MPEG standard (e.g., MPEG-H or MPEG-I).

Specifically, it is exemplarily illustrated in FIG. 6B that 3DoF audio rendering may be achieved by a 3DoF audio renderer that may discard the 6DoF metadata, to perform 3DoF audio rendering based only on the 3DoF encoded audio data obtained from the first bitstream part 302. That is, e.g., in case of MPEG-H 3DA backwards compatibility, the MPEG-H 3DA renderer can efficiently and reliably neglect/discard the 6DoF metadata in the extension part (e.g. the extension container(s)) of the bitstream so as to perform efficient regular MPEG-H 3DA 3DoF (or 3DoF+) audio rendering based only on the 3DoF encoded audio data obtained from the first bitstream part 302.

FIG. 6C schematically illustrates an exemplary 6DoF audio rendering based on the data representation and/or bitstream structure of FIG. 6A according to exemplary aspects of the present disclosure. As in FIG. 6*a*, the data representation and/or bitstream structure may have been encoded via an apparatus or system (e.g., software, hardware or via the cloud) that is compatible with an MPEG standard (e.g., MPEG-H or MPEG-I).

Specifically, it is exemplarily illustrated in FIG. 6C that 6DoF audio rendering may be achieved by a novel 6DoF audio renderer (e.g. according to MPEG-I or later standards) that uses the 3DoF encoded audio data obtained from the first bitstream part 302 together with the 6DoF metadata obtained from the second bitstream part 303, to perform 6DoF audio rendering based on the 3DoF encoded audio data obtained from the first bitstream part 302 and the 6DoF metadata obtained from the second bitstream part 303.

Accordingly, without or at least with reduced redundancy in the bitstream, the same bitstream can be used by legacy 3DoF audio renderers, which allows for simple and beneficial backwards compatibility, for 3DoF audio rendering and by novel 6DoF audio renderers for 6DoF audio rendering.

FIG. 7A schematically illustrates a 6DoF audio encoding transformation A based on 3DoF audio signal data according to exemplary aspects of the present disclosure. The transformation (and any inverse transformations) may be performed in accordance with methods, processes, apparatus or systems (e.g., software, hardware or via the cloud) that are compatible with an MPEG standard (e.g., MPEG-H or MPEG-I).

Exemplarily, similar to FIGS. 2 and 3 above, FIG. 7A shows an exemplary top view 202 of a room, including exemplarily plural audio sources 207 (which may be located behind walls 203 or its sound signals may be obstructed by other structures, which may lead to attenuation, reverberation and/or occlusion effects).

For 3DoF audio rendering purposes, the audio signals x of the plural audio sources 207 are transformed so as to obtain 3DoF audio signals (audio objects) on a sphere S around a default 3DoF position 206 (e.g. a listener position in a 3DoF sound field). As above, the 3DoF audio signals are referred to as $x_{3DA}$ and may be obtained by using the transformation function A such that:

$$x_{3DA}=A(x) \qquad \text{Equation No. (6)}$$

In the above expression, x denotes the sound source(s)/object signal(s), $x_{3DA}$ denotes the corresponding virtual 3DA object signals for 3DA producing the same sound field in the default 3DoF position 206, and A denotes the transformation function which approximates audio signals $x_{3DA}$ based on the audio signals x. The inverse transformation function $A^{-1}$ may be used to restore/approximate the sound source signals for 6DoF audio rendering as discussed already above and further below. Note that $A A^{-1}=1$ and $A^{-1}A=1$ or at least $A A^{-1}\approx 1$ and $A^{-1}A\approx 1$.

In a general way, the transformation function A may be regarded as a mapping/projection function that projects or at least maps the audio signals x onto the sphere S surrounding the default 3DoF position 206 in some exemplary aspects of the present disclosure.

It is to be further noted that 3DoF audio rendering is not aware of a VR environment (such as existing walls 203, or the like, or other structures, which may lead to attenuation, reverberations, occlusion effects, or the like). Accordingly, the transformation function A may preferably include effects based on such VR environmental characteristics.

FIG. 7B schematically illustrates a 6DoF audio decoding transformation $A^{-1}$ for approximating/restoring 6DoF audio signal data based on 3DoF audio signal data according to exemplary aspects of the present disclosure.

By using the inverse transformation function $A^{-1}$ and the approximated 3DoF audio signals $x_{3DA}$ obtained as in FIG. 7A above, the original audio signals x* of the original audio sources 207 can be restored/approximated as:

$$x^*=A^{-1}(x_{3DA}). \qquad \text{Equation No. (7)}$$

Accordingly, the audio signals x* of the audio objects 320 in FIG. 7B can be restored similar or same as the audio signals x of the original sources 207, specifically at same locations as the original sources 207.

FIG. 7C schematically illustrates an exemplary 6DoF audio rendering based on the approximated/restored 6DoF audio signal data of FIG. 7B according to exemplary aspects of the present disclosure.

The audio signals x* of the audio objects 320 in FIG. 7B can then be used for 6DoF audio rendering, in which also the position of the listener becomes variable.

When the listener position of the listener is assumed to be at the position 206 (same position as default 3DoF position), the 6DoF audio rendering renders the same sound field as the 3DoF audio rendering based on the audio signals $x_{3DA}$.

Accordingly, the 6DoF rendering $F_{6DoF}(x^*)$ at the default 3DoF position being the assumed listener position is equal (or at least approximately equal) to the 3DoF rendering $F_{3DoF}(x_{3DA})$.

Furthermore, if the listener position is shifted, e.g. to position 206' in FIG. 7C, the sound field generated in the 6DoF audio rendering becomes different, but may preferably occur smoothly.

As another example, a third listener position 206" may be assumed and the sound field generated in the 6DoF audio rendering becomes different specifically for the upper left audio signal, which is not obstructed by wall 203 for the third listener position 206". Preferably, this becomes possible, because the inverse function $A^{-1}$ restores the original sound source (without environmental effects such as VR environment characteristics).

FIG. 8 schematically illustrates an exemplary flowchart of a method of 3DoF/6DoF bitstream encoding according to exemplary aspects of the present disclosure. It is to be noted that the order of the steps is non-limiting and may be changed according to the circumstances. Also, it is to be noted that some steps of the method are optional. The method may, for example, be executed by a decoder, audio decoder, audio/video decoder or decoder system.

In step S801, the method (e.g. at a decoder side) receives original audio signal(s) x of one or more audio sources.

In step S802, the method (optionally) determines environment characteristics (such as room shape, walls, wall sound reflection characteristics, objects, obstacles, etc.) and/or determines parameters (parametrizing effects such as attenuation, gain, occlusion, reverberations, etc.).

In step S803, the method (optionally) determines a parametrization of a transformation function A, e.g. based on the results of step S802. Preferably, step S803 provides a parametrized or pre-set transformation function A.

In step S804, the method transforms the original audio signal(s) x of one or more audio sources into corresponding one or more approximated 3DoF audio signal(s) $x_{3DA}$ based on the transformation function A.

In step S805, the method determines 6DoF metadata (which may include one or more 3DoF positions, VR environmental information, and/or parameters and parametrizations of environmental effects such as attenuation, gain, occlusion, reverberations, etc.).

In step S806, the method includes (embeds) the 3DoF audio signal(s) $x_{3DA}$ into a first bitstream part (or multiple first bitstream parts).

In step S807, the method includes (embeds) the 6DoF metadata into a second bitstream part (or multiple second bitstream parts).

Then, in step S808, the method continues to encode the bitstream based on the first and second bitstream parts to provide the encoded bitstream that includes the 3DoF audio signal(s) $x_{3DA}$ in the first bitstream part (or multiple first bitstream parts) and the 6DoF metadata in the second bitstream part (or multiple second bitstream parts).

The encoded bitstream can then be provided to a 3DoF decoder/renderer for 3DoF audio rendering based on the 3DoF audio signal(s) $x_{3DA}$ in the first bitstream part (or multiple first bitstream parts) only, or to a 6DoF decoder/renderer for 6DoF audio rendering based on the 3DoF audio signal(s) $x_{3DA}$ in the first bitstream part (or multiple first bitstream parts) and the 6DoF metadata in the second bitstream part (or multiple second bitstream parts).

FIG. 9 schematically illustrates an exemplary flowchart of methods of 3DoF and/or 6DoF audio rendering according to exemplary aspects of the present disclosure. It is to be noted that the order of the steps is non-limiting and may be changed according to the circumstances. Also, it is to be noted that some steps of the methods are optional. The method may, for example, be executed by an encoder, renderer, audio encoder, audio renderer, audio/video encoder or an encoder system or renderer system.

In step S901, the encoded bitstream that includes the 3DoF audio signal(s) $x_{3DA}$ in the first bitstream part (or multiple first bitstream parts) and the 6DoF metadata in the second bitstream part (or multiple second bitstream parts) is received.

In step S902, the 3DoF audio signal(s) $x_{3DA}$ is/are obtained from the first bitstream part (or multiple first bitstream parts). This can be done by the 3DoF decoder/renderer and also the 6DoF decoder/renderer.

The, if the decoder/renderer is a legacy apparatus for 3DoF audio rendering purposes (or a new 3DoF/6DoF decoder/renderer switched to a 3DoF audio rendering mode), then the method proceeds with step S903, in which the 6DoF metadata is discarded/neglected, and then proceeds to the 3DoF audio rendering operation to render the 3DoF audio based on the 3DoF audio signal(s) $x_{3DA}$ obtained from the first bitstream part (or multiple first bitstream parts).

That is, backwards compatibility is advantageously guaranteed.

On the other hand, if the decoder/renderer is for 6DoF audio rendering purposes (such as aa new 6DoF decoder/renderer or a 3DoF/6DoF decoder/renderer switched to a 6DoF audio rendering mode), then the method proceeds with step S905 to obtain the 6Dof metadata from the second bitstream part(s).

In step S906, the method approximates/restores the audio signals x* of the audio objects/sources from the 3DoF audio signal(s) $x_{3DA}$ obtained from the first bitstream part (or multiple first bitstream parts) based on the 6DoF metadata obtained from the second bitstream part (or multiple second bitstream parts) and the inverse transformation function $A^{-1}$.

Then, in step S907, the method proceeds to perform the 6DoF audio rendering based on the approximated/restored audio signals x* of the audio objects/sources and based on the listener position (which may be variable within the VR environment).

In exemplary aspects above, there can be provided efficient and reliable methods, apparatus and data representations and/or bitstream structures for 3D audio encoding and/or 3D audio rendering, which allow efficient 6DoF audio encoding and/or rending, beneficially with backwards compatibility for 3DoF audio rendering, e.g. according to the MPEG-H 3DA standard. Specifically, it is possible to provide data representations and/or bitstream structures for 3D audio encoding and/or 3D audio rendering, which allow efficient 6DoF audio encoding and/or rending, preferably with backwards compatibility for 3DoF audio rendering, e.g.

according to the MPEG-H 3DA standard, and corresponding encoding and/or rendering apparatus for efficient 6DoF audio encoding and/or rending, with backwards compatibility for 3DoF audio rendering, e.g. according to the MPEG-H 3DA standard.

The methods and systems described herein may be implemented as software, firmware and/or hardware. Certain components may be implemented as software running on a digital signal processor or microprocessor. Other components may be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described herein are portable electronic devices or other consumer equipment which are used to store and/or render audio signals.

Example implementations of methods and apparatus according to the present disclosure will become apparent from the following enumerated example embodiments (EEEs), which are not claims.

EEE1 exemplarily relates to a method for encoding audio comprising audio source signals, 3DoF related data and 6DoF related data comprising: encoding, e.g. by an audio source apparatus, such as in particular an encoder, the audio source signals that approximate a desired sound field in 3DoF position(s) to determine 3DoF data; and/or encoding, e.g. by the audio source apparatus, such as in particular the encoder, the 6DoF related data to determine 6DoF metadata, wherein the metadata may be used to approximate original audio source signals for 6DoF rendering.

EEE2 exemplarily relates to the method of EEE1, wherein the 3DoF data relates to at least one of object audio signals, object directions, and object distances.

EEE3 exemplarily relates to the method of EEE1 or EEE2, wherein the 6DoF data relates to at least one of the following: 3DoF (default) position parameters, 6DoF space description (object coordinates) parameters, object directionality parameters, VR environment parameters, distance attenuation parameters, occlusion parameters, and reverberation parameters.

EEE4 exemplarily relates to a method for transporting data, in particular 3DoF and 6DoF renderable audio data, the method comprising: transporting, e.g. in an audio bitstream syntax, audio source signals that may preferably approximate a desired sound field in 3DoF position(s), e.g. when decoded by a 3DoF audio system; and/or transporting, e.g. in an extension part of an audio bitstream syntax, 6DoF related metadata for approximating and/or restoring original audio source signals for 6DoF rendering; wherein the 6DoF related metadata may be parametric data and/or signal data.

EEE5 exemplarily relates to the method of EEE4, wherein the audio bitstream syntax, e.g. including the 3DoF metadata and/or the 6DoF metadata, is/are complaint with at least a version of the MPEG-H Audio standard.

EEE6 exemplarily relates to a method for generating a bitstream, the method comprising: determining 3DoF metadata that is based on audio source signals that approximate a desired sound field in 3DoF position(s); determining 6DoF related metadata, wherein the metadata may be used to approximate original audio source signals for 6DoF rendering; and/or inserting the audio source signal and the 6DoF related metadata into the bitstream.

EEE7 exemplarily relates to a method for audio rendering, said method comprising: preprocessing of 6DoF metadata of approximated audio signals x* of original audio signals x in 3DoF position(s), wherein the 6DoF rendering may provide the same output as 3DoF rendering of transported audio source signals $x_{3DA}$ for 3DoF rendering that approximate a desired soundfield in 3DoF position(s).

EEE8 exemplarily relates to the method of EEE7, wherein the audio rendering is determined based on:

$$F_{6DoF}(x^*) \approx F_{3DoF}(x_{3DA}) \rightarrow F_{6DoF}(x) \text{ for } 3DoF$$

wherein $F_{6DoF}(x^*)$ relates to an audio rendering function for 6DoF listener position(s), $F_{3DoF}(x_{3DA})$ relates to audio rendering functions for 3DoF listener position(s), $x_{3DA}$ are audio signals that contain the effects of the VR environment for specific 3DoF position(s), and x* relates to approximated audio signals.

EEE9 exemplarily relates to the method of EEE8, wherein the approximated audio signals x* of original audio signals x are based on:

$$x^* = A^{-1}(x_{3DA})$$

wherein $A^{-1}$ relates to an inverse of an approximation function A.

EEE10 exemplarily relates to the method of EEE8 or EEE9, wherein metadata used to obtain the approximated audio signals x* of the original audio source signals x using the approximation method A is defined based on:

$$x_{3DA} := A(x), \|F_{3DoF}(x_{3DA}) - F_{6DoF}(x) \text{ for } 3DoF\| \rightarrow \min$$

wherein the amount of the metadata is smaller than the amount of audio data needed for transporting the original audio source signals x.

wherein the audio rendering is determined based on:

$$F_{6DoF}(x^*) \approx F_{3DoF}(x_{3DA}) \rightarrow F_{6DoF}(x) \text{ for } 3DoF$$

wherein $F_{6DoF}(x^*)$ relates to an audio rendering function for 6DoF listener position(s), $F_{3DoF}(x_{3DA})$ relates to audio rendering functions for 3DoF listener position(s), $x_{3DA}$ are audio signals that contain the effects of the VR environment for specific 3DoF position(s), and x* relates to approximated audio signals.

Exemplary aspects and embodiments of the present disclosure may be implemented in hardware, firmware, or software, or a combination of both (e.g., as a programmable logic array). Unless otherwise specified, the algorithms or processes included as part of the disclosure are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the disclosure may be implemented in one or more computer programs executing on one or more programmable computer systems (e.g., an implementation of any of the elements of the figures) each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the disclosure may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

A number of exemplary aspects and exemplary embodiments of the invention of the present disclosure have been described above. Nevertheless, it will be understood that various modifications may be made without departing from the spirit and scope of the invention of the present disclosure. Numerous modifications and variations of the present invention are possible in light of the above teachings. It is to be understood that within the scope of the appended claims, the invention of the present disclosure may be practiced otherwise than as specifically described herein.

The invention claimed is:

1. A method for decoding a bitstream, the method comprising:

receiving the bitstream comprising an encoded audio signal data associated with three degrees of freedom (3DoF) audio rendering and metadata associated with six degrees of freedom (6DoF) audio rendering, decoding the encoded audio signal data associated with 3DoF to obtain a 3DoF audio signal; and rendering the 3DoF audio signal to generate a sound field based on one of 3DoF audio rendering or 6DoF audio rendering, wherein the 6DoF audio rendering generates 6DoF audio signal data based on the 3DoF audio signal and the metadata associated with 6DoF, wherein the 3DoF audio rendering comprises:

ignoring the metadata associated with 6DoF; and performing the 3DoF audio rendering using the 3DoF audio signals wherein the 6DoF audio rendering comprises:

restoring original audio signals x* of the one or more audio sources from the 3DoF audio signal, using an inverse transform function $A^{-1}$; and performing the 6DoF audio rendering using the restored original audio signals x* and the metadata associated with 6DoF.

2. The method of claim 1, wherein the encoded audio signal data associated with 3DoF is generated by mapping original audio signals x of the one or more audio sources onto corresponding audio objects positioned on one or more spheres surrounding a default 3DoF listener position, using a transform function A.

3. The method according to claim 1, wherein the encoded audio signal data associated with the 3DoF audio rendering comprises at least one of: one or more audio objects, directional data of the one or more audio objects, and distance data of the one or more audio objects.

4. The method according to claim 3, wherein the one or more audio objects are positioned on one or more spheres surrounding a default 3DoF listener position.

5. The method according to claim 1, wherein the metadata associated with 6DoF audio rendering is indicative of one or more default 3DoF listener positions.

6. The method according to claim 1, wherein the metadata associated with 6DoF audio rendering is indicative of at least one of: a description of 6DoF space, audio object directions of one or more audio objects, a virtual reality environment, at least a parameter relating to at least one of distance attenuation, occlusion, and reverberations.

7. The method according to claim 2, wherein the encoded audio signal data associated with 3DoF audio rendering was determined based on the original audio signals from one or more audio sources and the transform function A.

8. The method according to claim 7, wherein the encoded audio signal data associated with 3DoF audio rendering was determined by transforming the original audio signals from the one or more audio sources into the 3DoF audio signal using the transform function A, wherein the transform function A mapped the original audio signals of the one or more audio sources onto respective audio objects positioned on the one or more spheres surrounding the default 3DoF listener position.

9. The method according to claim 1 wherein the bitstream is compatible with an MPEG-H 3D Audio standard.

10. The method according to claim 1, wherein the encoded audio signal data associated with the 3DoF audio rendering is part of a payload of the bitstream, and the metadata associated with the 6DoF audio rendering is part of one or more extension containers of the bitstream.

11. A non-transitory computer program product including instructions that, when executed by a processor, cause the processor to execute the method of claim 1.

12. An audio decoder apparatus for decoding a bitstream, the apparatus comprising:

a receiver for receiving the bitstream comprising an encoded audio signal data associated with three degrees of freedom (3DoF) audio rendering and metadata associated with six degrees of freedom (6DoF) audio rendering, a decoder for decoding the encoded audio signal data associated with 3DoF to obtain a 3DoF audio signal; and a renderer for rendering the 3DoF audio signal to generate a sound field based on one of 3DoF audio rendering or 6DoF audio rendering, wherein the 6DoF audio rendering generates 6DoF audio signal data based on the 3DoF audio signal and the metadata associated with 6DoF, wherein the 3DoF audio rendering comprises:

ignoring the metadata associated with 6DoF; and performing the 3DoF audio rendering using the 3DoF audio signal, wherein the 6DoF audio rendering comprises:

restoring original audio signals x* of the one or more audio sources from the 3DoF audio signal, using an inverse transform function $A^{-1}$; and performing the 6DoF audio rendering using the restored original audio signals x* and the metadata associated with 6DoF.

* * * * *